Figure 1:
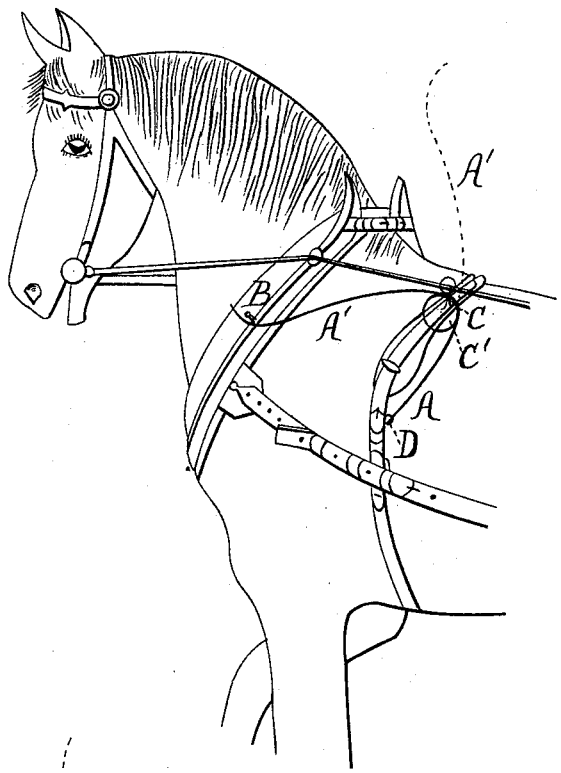

(No Model.)

I. HICKS.
HARNESS ATTACHMENT.

No. 400,211. Patented Mar. 26, 1889.

WITNESSES,
J. J. Stevens
L. S. Bacon

INVENTOR,
Isaac Hicks
By Stout & Underwood
Attorneys.

UNITED STATES PATENT OFFICE.

ISAAC HICKS, OF HARTFORD, WISCONSIN.

HARNESS ATTACHMENT.

SPECIFICATION forming part of Letters Patent No. 400,211, dated March 26, 1889.

Application filed September 23, 1886. Serial No. 214,393. (No model.)

*To all whom it may concern:*

Be it known that I, ISAAC HICKS, a citizen of the United States, residing at Hartford, in the county of Washington and State of Wisconsin, have invented a new and useful Manufacture, to be used as an Attachment to Draft-Harnesses, both single and double; and I do hereby declare that the following is a full, clear, and exact description of the invention, which will enable others skilled in the art to make and use the same.

It is a fact well known to drivers, teamsters, and others that a draft-harness as usually put on the animal and as adjusted causes the weight of the collar and hames, pole, and neck-yoke to rest upon the top of the animal's neck, the weight of which and the rubbing of the collar tend to gall, irritate, and make and keep sore the animal's neck.

My device and invention relate to a remedy for this by raising the collar and hames from the top of the animal's neck, allowing the air to circulate between the collar and the animal's neck, and preventing the galling, chafing, and rubbing of the collar against the top of the animal's neck, and transferring the weight of the collar, hames, neck-yoke, and pole from the neck to the back of the animal, where the saddle or back-pad of the harness ordinarily rests. I attain these objects by the use of a metallic spring, one on each side of the animal, as shown in the drawings, each spring operating as a spring and lever combined, as illustrated in the accompanying drawings, in which—

Figure 2:
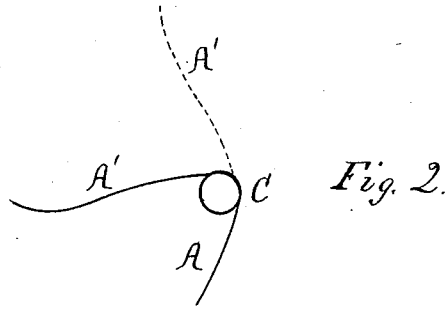

Figure 1 represents my attachment applied to a harness, and Fig. 2 represents a detail view of the attachment.

A A represent a metallic spring secured to the saddle of harness at C the short arm of the spring being attached to the line of draft at D, while the long or forward arm is forced down and under the fastener B, which consists of a staple or hook secured on the hame.

A' represents the long or forward arm of the spring (shown in dotted line) in its position when released from its attachment at B, and shows its direction of lifting and its lifting-power when freed from attachment.

In Fig. 2 the spring is shown detached from the harness, the arms of the spring being in position as when attached. A' is the long or forward arm, being shown in dotted lines in its natural position, released from attachment. C is the coil of spring. The spring is a metallic spring with a coil between two arms, a long and shorter one. A coil, C, of about one and one-half times is found to be sufficient to exert the requisite lifting-force. The number of coils, however, is immaterial, except in determining the amount of lifting-power of the long arm. The lifting-power of the long arm is affected also by the size of the metallic rod or wire used in constructing the spring. The long arm of the spring acts as a lever, lifting that to which its extremity is fastened. In Fig. 1 the drawing shows the spring attached to the harness at C. It is found convenient to attach it near the coil of the spring. While a rigid attachment of the short arm is desirable, a slight motion, as if secured by a strap or rope, does not affect its working. The freedom of the short arm should, however, be but slight. I find it desirable to not use a rigid attachment at the hame, but to allow a forward and backward play of the long arm of an inch or two, so that, when the animal is backing, the spring will adjust itself to the forward motion of the lower part of collar. The length of the arms of the spring will vary when adjusted to different-sized animals.

The manner of practicing, operating, and using the device is substantially as follows: Two of the devices are used on each animal, one on each side—the right and left. The short arm of the spring is attached to the harness, as above stated. The device is also attached to the harness at its coil C. I find the most convenient mode of attachment is to place the coil over the terret of saddle and fasten with strap and buckle. The harness being placed upon the animal and adjusted, the long arm of the spring is then forced down and forward from its natural position and secured under the fastener B on the hame, which is found to be the best and most convenient place. The extremity of the long arm is curved upward and thus is allowed a slight forward and backward motion of the long arm, while the curved end of the arm will prevent its slipping entirely by the fastener at B. On each side of the harness the spring is similarly adjusted and secured, and when so adjusted the spring acts as a combined spring and lever, the long arm constantly exercising a uniform lifting-force, raising the top of the collar slightly from the neck of the animal, so that it no longer rests upon the top of the animal's neck, but leaving a free space between the collar and the top of animal's neck, through which the air can circulate. The top of the collar being thus lifted from the neck of the animal, all rubbing, chafing, and pressure of the collar upon the neck of the animal are dispensed with. With the lifting of the collar and hames, the weight of them and also the weight of the neck-yoke, pole, and other attachments is transferred to the back of the animal, where the saddle or back-pad usually rests.

What I claim as the invention, and desire to secure by Letters Patent, is—

1. The harness attachment herein described, consisting of a spring having two arms bent in opposite directions and adapted to be placed in contact with the hames and the saddle, respectively, whereby the former is raised, substantially as described.

2. In a harness, the combination, with the saddle and hames, of the coiled spring secured on said saddle, having its ends extending out in opposite directions and secured to said hames and saddle, respectively, substantially as described.

ISAAC HICKS.

Witnesses:
H. K. BUTTERFIELD,
J. M. LE COUNT.